United States Patent [19]
Lu

[11] Patent Number: 5,767,663
[45] Date of Patent: Jun. 16, 1998

[54] VEHICULAR POWER PRODUCING SYSTEM

[76] Inventor: Min-Der Lu, 13823 Crested Rise, San Antonio, Tex. 78217

[21] Appl. No.: 666,260

[22] Filed: Jun. 20, 1996

[51] Int. Cl.⁶ .................................................. H02K 7/00
[52] U.S. Cl. .............................. 322/12; 322/46; 180/24; 310/67 R
[58] Field of Search ................................ 322/12, 16, 46; 180/24; 310/67 R; 320/15

[56] References Cited

U.S. PATENT DOCUMENTS

| | | | |
|---|---|---|---|
| 3,837,442 | 9/1974 | Baermann | 188/159 |
| 4,181,188 | 1/1980 | Dessert | 180/2 A |
| 4,237,410 | 12/1980 | Erickson et al. | 320/14 |
| 4,270,622 | 6/1981 | Travis | 180/65 |
| 4,314,160 | 2/1982 | Boodman et al. | 290/55 |
| 4,496,016 | 1/1985 | Unsworth et al. | 180/53.6 |
| 4,951,769 | 8/1990 | Kawamura | 180/65.4 |
| 5,178,403 | 1/1993 | Kemner et al. | 280/423.1 |
| 5,215,156 | 6/1993 | Stulbach et al. | 180/65.3 |
| 5,280,827 | 1/1994 | Taylor et al. | 180/165 |
| 5,283,470 | 2/1994 | Hadley et al. | 290/45 |
| 5,287,004 | 2/1994 | Finley | 290/55 |
| 5,412,269 | 5/1995 | Couture | 310/67 R |
| 5,488,287 | 1/1996 | Kemner et al. | 322/20 |
| 5,504,414 | 4/1996 | Kinoshita | 320/15 |

*Primary Examiner*—Steven L. Stephan
*Assistant Examiner*—Nicholas Ponomarenko
*Attorney, Agent, or Firm*—Royston, Rayzor, Vickery, Novak & Druce, L.L.P.

[57] ABSTRACT

A system for producing electrical power on a wheeled vehicle is disclosed. The system includes a wheeled vehicle that has a chassis carried upon a plurality of wheel units where each wheel unit is rotatably coupled to the chassis. The wheel unit includes a wheel and a hub upon which the wheel rotates relative to the chassis. At least one of the wheel units is adapted to generate electricity and has at least one length of reactive wire and a magnetic field generator positioned in the wheel unit for relative motion therebetween during rotation of the wheel. The configuration induces an electrical flow in said length of reactive wire thereby producing electricity.

19 Claims, 3 Drawing Sheets

VEHICULAR POWER PRODUCING SYSTEM

FIELD OF THE INVENTION:

This invention relates generally to power reclamation and generating systems on rolling vehicles. More specifically, this invention relates to systems that derive and generate electrical power from the rolling action of the wheels of a vehicle, with optional compliments from solar generators that may additionally convey electricity to power storage receptacles such as batteries for later utilization.

BACKGROUND OF THE INVENTION:

A primary mode of transportation is the use of rolling vehicles for both people and things. These modes of transportation take many different forms and among others, include rail and road surface traffic. The rolling stock used in these several modes are different in many ways, but all commonly employ round rolling wheels as an essential component that makes the travel possible. In fact, even those modes of transportation that are not primarily land based typically depend on some rolling means while on land, even if their utilization is only intermittent and for relatively short periods of time. Examples would be the towable trailers upon which boats are carried when transported over land; another example is the landing gear of airplanes that supports the aircraft while taxying and being parked at airports. Like cars and trains, trailers and planes have round wheels that rotate whenever the vehicle traverses across land.

Primarily in the land based vehicles, but also to a certain extent in the other modes, an abundant resource of potential power production is wasted and lost in the rotational movement of the millions of existing rolling wheels and tires. It is a basic principle of physics that a force must be exerted on a resting object to cause it to move. In the case of a stationary vehicle, the driving force that moves it along is commonly a motor powered by an energy source such as gasoline or electricity. As the vehicle travels, the energy that has been input into the system is dissipated against both internal and external resistances. The internal resistances primarily include friction experienced between contacting parts that must move relative to one another to accomplish travel. The external resistances include wind resistance and the resistance experienced by the rolling wheel or tire at its contact with the ground.

There are additional loads placed on a vehicle's motor by nearly every accessory that must be receive power to operate. In an automobile, these may include air conditioners, heaters, stereos, and power windows, only to name a few. An amount of energy is also embodied within the traveling vehicle in what is commonly referred to as momentum. Momentum is quantified by multiplying the mass of the vehicle by its velocity. Therefore the momentum of the vehicle increases as its speed increases. This momentum must be counteracted for the vehicle to slow. All of the forces acting to impede that vehicle's travel also counteract the momentum force, but often these latent resistances are insufficient to slow the vehicle at the desired rate, or to stop its travel abruptly. As a remedy, brakes are incorporated into virtually every rolling vehicle for adjusting speed downwardly. In general, brakes operate by applying a "drag" force to one or more of the rolling components of the vehicle that in turn slows the vehicle and can ultimately fix the rolling components thereby halting travel. In the braking process, energy is dissipated in the form of frictional heat that is discharged to the atmosphere. In view of these aspects, rolling components are generally considered to be power consumers, and not power producers. It is, however, recognized that there are known systems for reclaiming portions of the input energy from a moving vehicle. In the reclamation process, however, energy is not actually produced, it is merely converted back to a storable form. In these reclamation processes, the conversions are not one hundred percent efficient and a certain portion of energy is lost while another portion is stored.

These reclamation processes should be contrasted to the present invention's ability to produce energy, not merely convert energy that has been input back to a storable form. A commonly known method for drawing power from a moving vehicle is the imposition of a generator between parts of the vehicle that move relative to one another, but that are positionally fixed on the vehicle. An example is the rotating tire and wheel of an automobile relative to the chassis. As the vehicle traverses and moves with respect to the ground, these portions of the vehicle are permanently positioned with respect to one another, but are not relatively fixed because of the rotational motion of the tire. There have been prior attempts made at reclaiming some of the energy lost to friction in the slowing and stopping of land based vehicles. Still further, systems are known that derive power from a vehicle that is rolling downhill by converting the gravitational force acting on that vehicle to electrical power.

One kind of vehicle in which it has been found particularly advantageous to include an electricity generating system is the electric automobile and other types of electrically powered vehicles. Conventionally, these vehicles have been powered by batteries within which electrical energy is stored and from which electricity is supplied to electric driving motors. Because these vehicles require relatively often recharging of those batteries, currently available designs for such vehicles have not proven commercially feasible. If systems were available that would decrease the frequency at which electrical recharging had to take place, these vehicles, including their many benefits, would be able to be capitalized upon and enjoyed on a wide spread basis. For these reasons, the ability to produce electrical power from the rotation of the vehicle's wheels would be particularly advantageous to electrically powered and driven automobiles.

An example of such a known device is the Drive Axle For Electric Vehicle of U.S. Pat. No. 4,270,622 issued to Travis. Therein, the drive axle of an electric powered vehicle is placed in communication by a pinion gear with an electric generator that converts rotational movement into electric power that may be stored for subsequent use. It is contemplated that a plurality of such pinion gear generators may be employed, each having a different peak efficiency speed. The individual generators are selected based on their peak efficiency at a particular speed. By employing several variously rated generators having different peak efficiencies, they may be individually or in combination engaged with the drive axle so that regardless of the drive shaft or rolling speed of the vehicle, peak power generation is achieved. It is further contemplated that these generators may act as electric motors when used in a reversed manner that can then be used to drive the vehicles upon which they are carried.

An example of a system that generates electrical power when a vehicle is slowing or traveling downhill is found in U.S. Pat. No. 5,215,156 issued to Stulback et al for an Electric Vehicle With Downhill Electro-Generating System. A dynamoelectric generator is disclosed that engages automatically when the carrying vehicle is slowing or progressing downhill. In this particular invention, a roller-ball switch is utilized that is capable of detecting when the vehicle is either slowing or progressing down an inclined plane. Upon the detection of such a condition, the dynamoelectric generator is physically coupled to the automobile's axle and driven thereby. This type of generator, however, requires a physical couplement with a transfer means that ultimately imparts a rotational input to the generator. A generator of this type imposes a retarding frictional load on the car's forward progress and therefore may only be advantageously utilized when the car is slowing or going downhill. If the system was to be engaged during normal powered travel of the vehicle, it would be a detrimental load to the system and ultimately decrease the vehicle's efficiency because of the inherent losses experienced through the generator's operation.

Another example of an electric generator being incorporated onto a rolling vehicle is found in U.S. Pat. No. 5,178,403 issued to Kemner et al for an Electrical Energy Generating Device For A Wheeled Semi-Trailer. An electric generator is included on the trailer portion of trailer for producing electricity to feed an on-board power consuming device. Such a device might include refrigeration and heating, and it is contemplated that the power for such a generator may be derived either from an axle torsional connection to one of the wheels or connection to a compressed air source present on the tractor portion of the trailer combination.

Other examples of systems that have been previously patented that derive electrical power from traveling vehicles are found in U.S. Pat. No. 4,496,016 for Land Vehicles issued to Unsworth et al. Therein, a power take-off from the wheels from which power is derived is disclosed U.S. Pat. No. 5,280,827 for a Venturi Effect Charging System For Automobile Batteries to Taylor et al includes turbines that are driven by air passing around a traveling vehicle. Electricity is generated by the movement of the turbine. An Automobile Air and Ground Effects Power Package is disclosed in U.S. Pat. No. 5,287,004 to Finley. Therein, an automobile is modified to include an air dam at its front end and a spoiler at its upper rear end that direct moving air about rotors that generate electricity.

Known methods for deriving electrical power from traveling vehicles either impose on the vehicle's forward travel or the powering of the vehicle during normal operation. As a result, to be useful energy reclamation sources, employment of these known methods should be limited to the relatively short time periods when the vehicle has excessive momentum; those times being when the vehicle is either slowing or traveling downhill.

In all of the known examples, none take advantage of the motion of the wheels and/or tires relative to the traveling vehicle in a way that does not counter the vehicle's travel.

A system that generates energy from a vehicle's relative motion without robbing it of propulsion power has substantial benefits that could elevate such technologies as electrically powered vehicles to feasible and commercializable products attractive to the consumer. With these ends in sight, the present invention has been developed.

SUMMARY OF THE INVENTION:

The present invention takes several components and combines them into an unique combination that has characteristic advantages and features affording it the ability to derive power from the rotational motion of the rotating wheels of a vehicle. This system's inclusion on a land vehicle does not compromise the vehicle's efficiency or impede its travel over land. An active and primary electromagnetic electricity generating system may be complemented by a supplementary passive power generating system that converts solar energy into electricity. When both are included, the two systems are coupled together in such a way that the electricity produced by each generator is cumulatively collected and stored thereby deriving a synergistic benefit from each other's inclusion. More simply put, both the active and passive generators work together to produce a sum of power that may be more advantageously utilized than the systems on an individual and separate basis.

In a preferred embodiment, the driving components of an electromagnetic generator are incorporated into one or more of the wheel systems of a land vehicle. Because power is derived from the rotational movement of a wheel's components about a central axis, the generator may be incorporated upon any land based vehicle whose mode of travel is rolling across the ground on a wheeled chassis. Therefore, its utility may be applied to such modes of transportation as rail vehicles, street vehicles, towed trailers and even the landing gear systems of aircraft. Each of these examples includes wheels that rotate relative to the vehicles upon which they are carried. As a result, by including magnetic field sources and metal wire(s) that pass relative to one another on the wheel systems, electricity is generated in the wire that can be used to power other devices or can be stored for later use.

Except for a unicycle, most vehicles have a plurality of wheels upon which they are carried. In most situations, there will be four or more wheels and each will rotate about a central axle. As such, each of those wheels provides a source for the generation of electricity when the vehicle is traveling and the wheels are rotating. In that each may act as a separate and individual generator, they may be selectively combined to produce electricity in different quantities and capacities based on need and capabilities for storage.

It is contemplated that the rotational motion of the wheel about its center axis may be amplified or complemented by driving another rotatable component located at that axis in an opposite direction to the rotational direction of the wheel. In this case, this interior hub that is backwardly rotated is concentrically oriented to the wheel. The opposite directions of rotation may be accomplished by simply providing a reversing gear between the wheel and this central hub to potentiate the electricity that may be generated based on the compounded relative movement therebetween.

In operation, the electricity generated by the generators will be conveyed therefrom by conventional means either to a consuming device requiring electrical power at that time or to a battery bank or similar storage device where it will be retained for later utilization.

As a complement to the mechanical generation of electricity, the present invention contemplates the optional inclusion of a solar generating system capable of being inconspicuously roof mounted upon the vehicle, and like the other generator, coupled to the battery bank for storage of the produced electricity. The storage facility will have the ability to receive a plurality of power inputs and commonly store power therein. It will also be possible for power to be discharged from the batteries to a plurality of consuming means such as electric driving motors that power the vehicle. Additionally, the stored power may be conducted to components upon the vehicle that are powered by electricity such as refrigeration units or other accessories that require electricity to run. Ultimately, it is anticipated that surplus power from the several sources will be available for use outside the confines of the vehicle. Therefore, a discharge conduit will be provided through which electricity can be off-loaded to a separate reservoir such as a public utility or other battery bank for use outside of the vehicle.

A particularly suited host for such a system would be an electrically powered automobile. Because the energy used to drive the vehicle is electricity, the ability of a vehicle to generate its own driving power as it progresses down the road is particularly advantageous. This could be compared to a gasoline driven automobile capable of manufacturing gasoline as it travels down a highway, and then using that manufactured gasoline for further travel, and from which more gasoline is produced. Based on the efficiency of these systems, the loop could be theoretically endless and potentially include the production of surplus fuel.

Obviously, the benefits derived from a system designed according to the present invention provides substantial benefits from both a commercial, as well as an environmental perspective. From the environmental viewpoint, the utilization of electricity is "clean" and nonpoluting. Therefore, vehicles designed and manufactured according to the present invention will drastically reduce the pollutant load contributed by land based vehicles. This, coupled with the commercial aspects of the invention that include reduce operating costs and fuel savings make these products attractive.

This invention includes features and/or components that have been invented and selected for their individual and combined benefits and superior performance as a power reclamation and producing system upon a rolling vehicle. The system includes multiple components that individually and singularly have new and novel features in and of themselves. Each of the individual components, however, work in association with, and are optimally mated to the others. Together, they yield a complimentary power source and generator system that has superior performance capabilities.

In one specific embodiment of the present invention, a system for producing electrical power on a wheeled vehicle is disclosed. The system includes a wheeled vehicle that has a chassis carried upon a plurality of wheel units where each wheel unit is rotatably coupled to the chassis. The wheel unit includes a wheel and a hub upon which the wheel rotates relative to the chassis. At least one of the wheel units is adapted to generate electricity and has at least one length of reactive wire and a magnetic field generator positioned in the wheel unit for relative motion therebetween during rotation of the wheel. The configuration induces an electrical flow in said length of reactive wire thereby producing electricity.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

Figure 1:
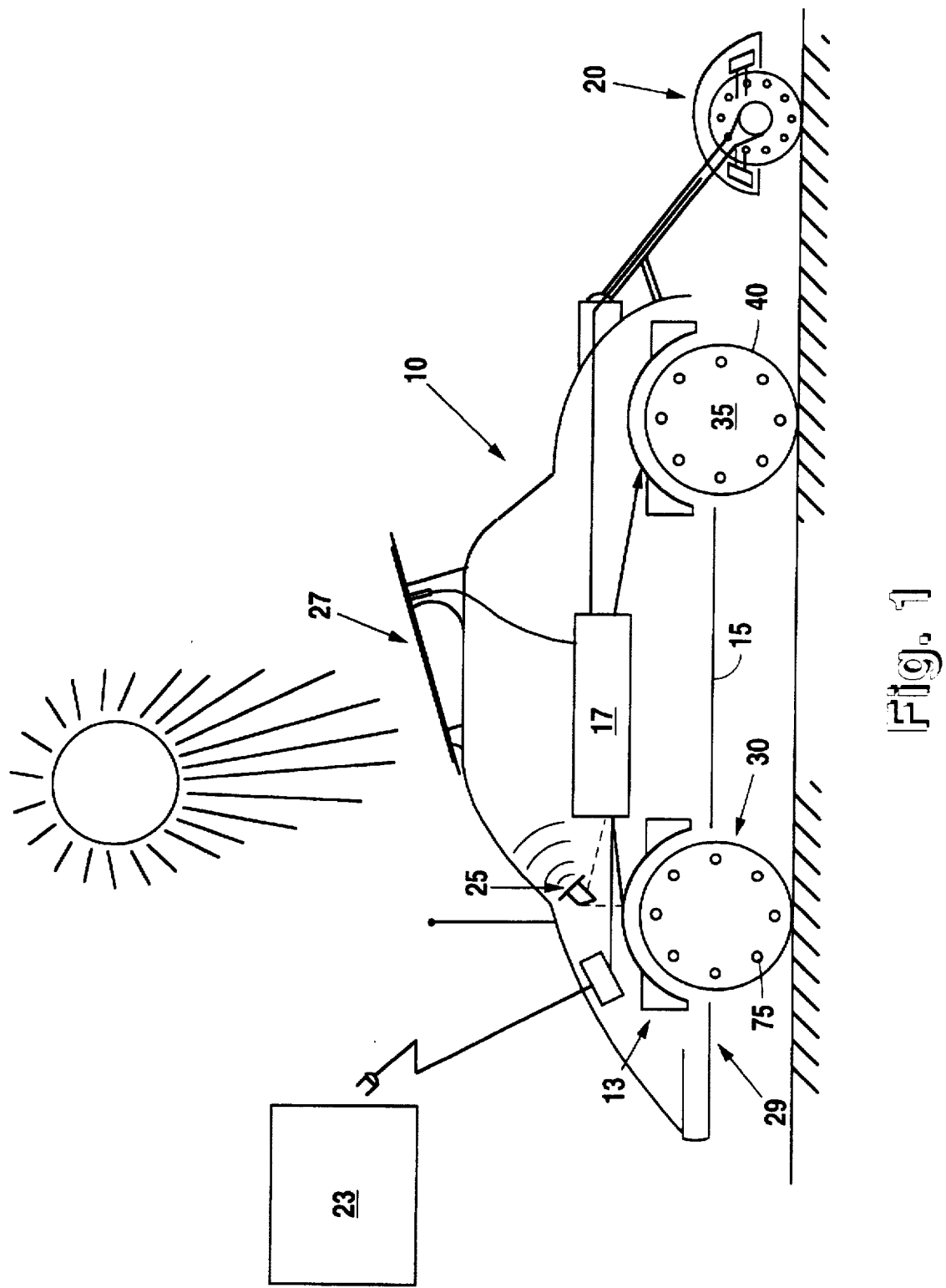
FIG. 1 is a side view of the vehicular power producing system.

DETAILED DESCRIPTION OF THE INVENTION:

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

Certain terminology will be used in the following description for convenience and reference only and not for purposes of limitation. For example, the words "rightwardly", "leftwardly", "upwardly" and "downwardly" will refer to directions in the drawings to which reference is made. The words "inwardly" and "outwardly" refer to directions toward and away from, respectively, the geometric center of the structure being referred to. This terminology includes these words, specifically mentioned derivatives thereof, and words of similar import.

Furthermore, elements may be recited as being "coupled"; this terminology's use anticipates elements being connected together in such a way that there may be other components interstitially located between the specified elements, and that the elements may be connected in fixed or movable relation one to the other. Certain components may be described as being adjacent to one another. In these instances, it is expected that such a relationship so described shall be interpreted to mean that the components are located proximate to one another, by not necessarily in contact with each other. Normally there will be an absence of other components positioned therebetween, but this is not a requirement. Still further, some structural relationships or orientations may be designated with the word "substantially". In those cases, it is meant that the relationship or orientation is as described, with allowances for variations that do not effect the cooperation of the so described component or components.

Referring to Fig. 1, a wheeled vehicle 10 is illustrated and in this particular configuration is shown as an automobile having a chassis 15 carried on wheels 35 that rotate thereunder. As previously described, a primary concept of the present invention is to generate power on the traveling vehicle and either use the generated electricity in consuming devices 25, most commonly taking the form of accessories on the vehicle, or store it for later use in electrical power storage units 17, typically taking the form of one or more batteries in a bank. In the event of stored electricity, it is anticipated that the retained power will be intermittently discharged through a discharge connectors 95 to electrical power acceptors 23 such as outside battery storage units or public utilities. This type of discharge of electricity back to a public utility can be compared to those who generate wind driven power and sell the surpluses back to their supplying public utility by reversing the flow of power through their meter. As a result of the reversal of power flow, the meter spins backward and the power discharged back to the utility is credited toward that consumed.

The electricity generated on the vehicle 10 is contemplated to come from two sources in the present invention. The primary source is generators 29 configurated into wheel units 30 upon which the chassis 15 of the vehicle 10 is carried. It is contemplated that one or more wheel units 30 may be adapted to generate electricity thereby permitting a plurality of wheel-driven generators 29 to be established on a particular vehicle 10. In the most common case of an automobile as is shown in FIG. 1, there will be four wheels 35 which may be adapted for electricity generation. It is further contemplated that an auxiliary wheel unit 20 may be connected to the wheeled vehicle 10 so that additional electricity may be derived from the rotation of that unit 20.

Figure 2:
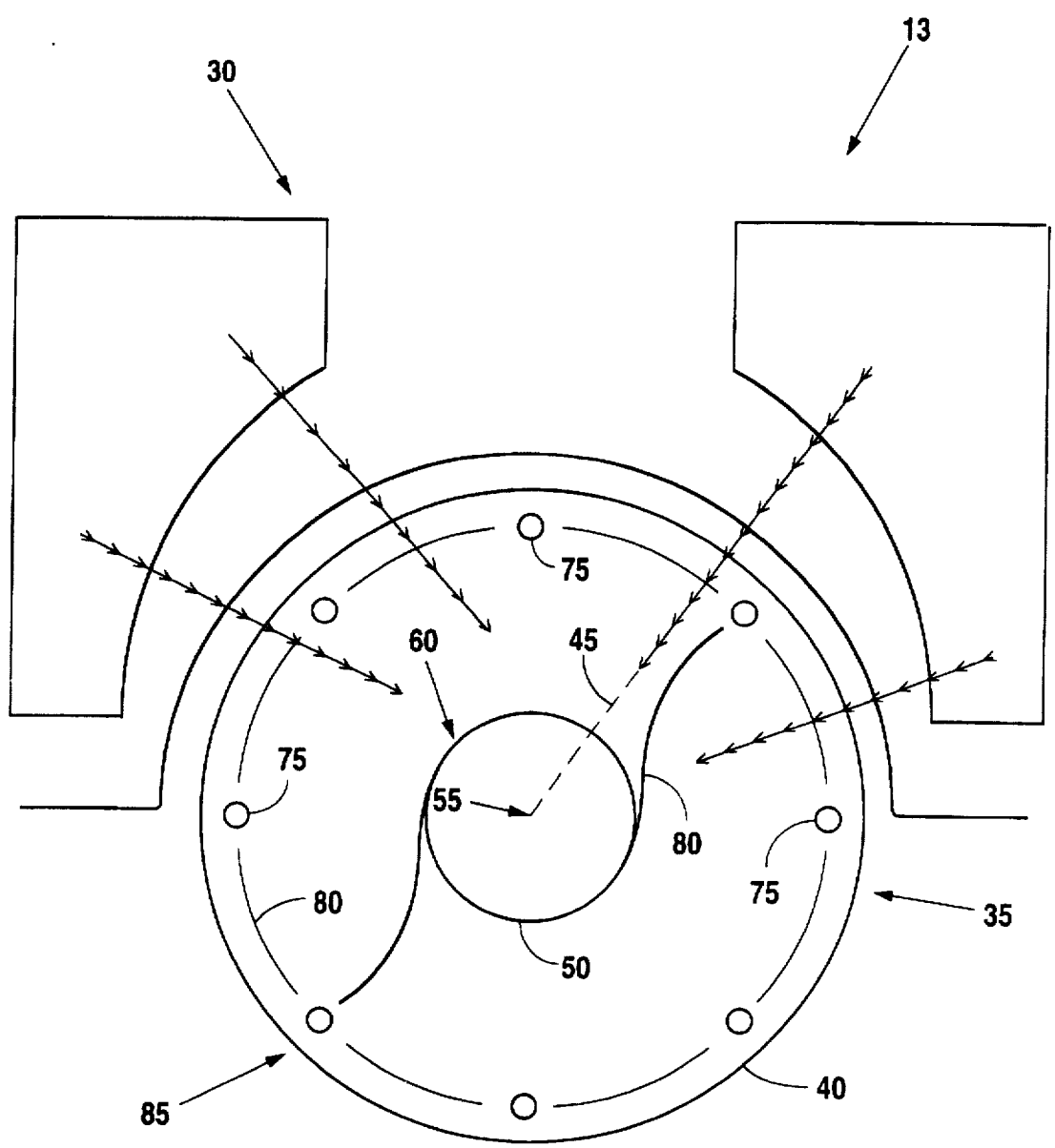
FIG. 2 is a schematic side view of the wheel unit of the present invention.

Referring to FIG. 2, an individual wheel unit 30 has been illustrated showing a wheel 35 rotating upon a hub 50 between devices that serve as a magnetic field or force generator 13 and produce a magnetic force that is directed toward the wheel 35. As is well known to those having ordinary skill in the electricity generating arts, an electricity flow may be readily generated in a wire cutting or passing through a magnetic field. In order to generate electricity in this manner, the wire in which the electricity is going to be generated must pass across the magnetic force, not parallel thereto. These basic electricity generating concepts are described in such books as Gregory Vogt's *Generating Electricity* published by Franklin Watts in 1986. Therein, the basics of electricity generation through the use of magnetic generators is explained. These concepts include both alternating current (AC) and direct current (DC). The principles and concepts of this invention are consenant with those described within that publication and known within the art. Specifically, reactive wire segments 75 are included within the wheel 35 and located proximate to a circumferential perimeter 40 of that wheel 35. These reactive wires 75 are oriented so that during rotation of the wheel 35 the wires 75 cut through the magnetic field or force of the generator 13.

In the embodiment of FIG. 2, the wheel 35 is shown to rotate between two magnetic field generators 13, each of which directs a magnetic force toward the hub 50 of the wheel 35 so that the lines of flux of the magnetic field are semi-aligned of a radius 45 with that wheel 35. The hub 50 has a center point 55 about which the wheel rotates and from which the radius 50 may be considered to extend toward the circumferential perimeter 40.

In a preferred embodiment, and particularly related to automobiles, the wheel 35 includes an elastomer based tire within which the reactive wires 75 are embedded. These wires may be included within the body of the tire in a manner similar to the wires in steel belted tires. These reactive wires 75, however, are oriented so that they extend across the tread with of the tire and are substantially perpendicular to radii of the wheel 35. These configurations, however, should not be considered restrictive. What is important is that the reactive wire 75 be oriented within the wheel 35 or tire so that they pass through the magnetic field. It is not necessary that this passage be perpendicular; however, this is advantageous for maximizing the electricity generation achieved therefrom. In that these reactive wires 75 individually generate electricity, it is required that the electricity from each wire be accumulated into amounts that are useable. Therefore, transfer wires 80 are placed interstitially between the reactive wires so that those wires 75 are connected in series. This transfer wire 80 is then extended from the series to the hub 50.

In at least one embodiment, the electricity generated is transferred across a slip connection 60 and then further conveyed to the electrical power storage unit 17 which is normally a battery bank. It is contemplated that a transfer wire 80 could be included for each reactive wire for connecting that wire 75 to the slip connector 60. This configuration, however, is not as advantageous as the series connection because it requires multiple connections at the hub 50 and further complicates the design.

The slip connection 60 may take the form of a conventional brush and contact ring which facilitate contact and transfer of electricity across the connection, while at the same time facilitating relative motion therebetween. This is necessary to allow the electricity to be generated in the rotating wheel 35 or tire and be transferred over to the vehicle 10. A direct connection is not possible because a twisting of the connective wires would result.

From the slip connection 60 on the wheeled vehicle 10 side, the electricity is transferred through a transmitting wire 87 to either the power storage unit 17 or the electrical power consuming device 25. In the event that the electricity is routed directly to a consuming device 25, there is the possibility that all available power will not be consumed and there will be surplus power that should be stored for later use. In that event, that surplus power is conveyed along a surplus power feed wire 90 to the storage unit 17.

During the travel of the vehicle 10, significant amounts of stored electricity may be achieved. As a result, it will become necessary to occasionally discharge that stored electricity through the discharge connector 95 that is incorporated into the vehicle 10 for making an "electrical deposit" into such a receiver as a public utility.

It is contemplated that the reactive wires 75 and transfer wires 80 may be configured into a wire coil 85 that is at least partially incorporated about the circumferential perimeter 40 of the wheel 35. That being the case, generated electricity from the reactive wire portions 75 may be conveyed along the length of the wire coil 85 and ultimately passed to the wheeled vehicle 10 across the slip connection 60 to which the wire coil 85 is run. In this configuration, it is important that only the reactive wire portions 75 cut across the magnetic field. Otherwise, the electricity generated therein may be in opposing direction and the net electricity generated could be negligible.

Figure 3:
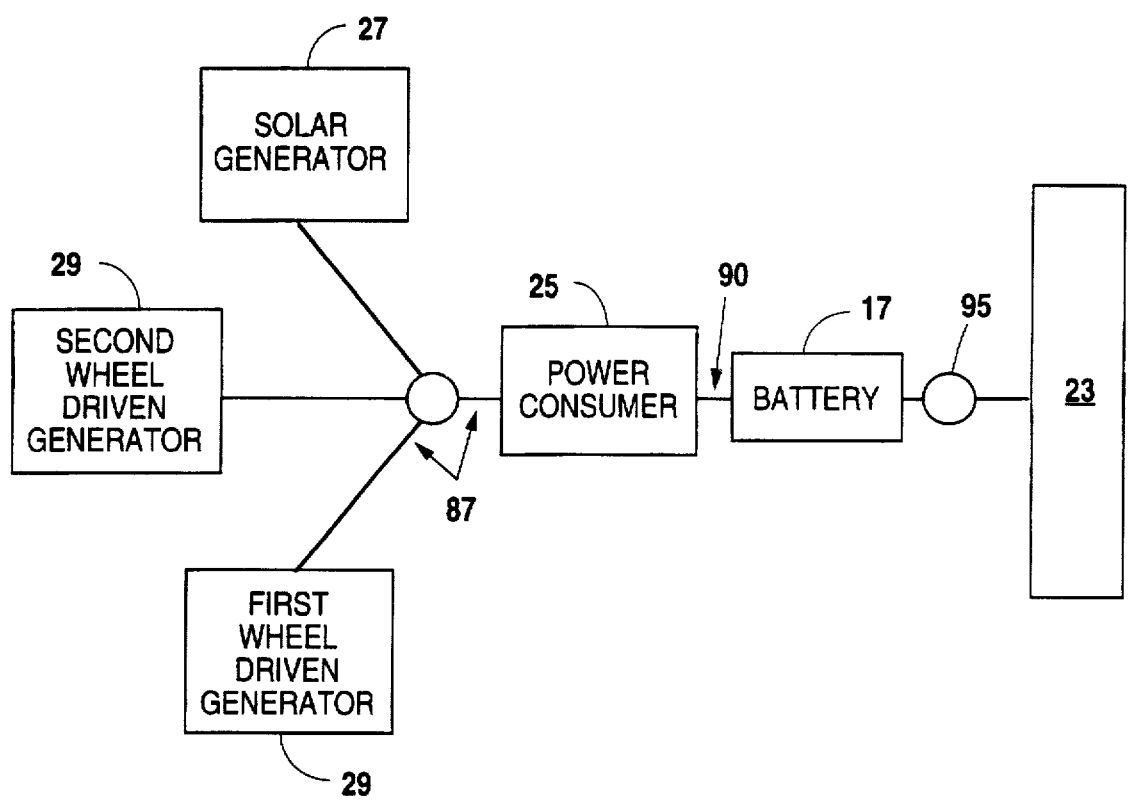
FIG. 3 is a block diagram of the present invention.

FIG. 3 shows a schematic of the system of the present invention in which a plurality of wheel units 30 are connected together to convey generated electricity to a transmitting wire 87. As an option, it is contemplated that a solar generator 27 may also be incorporated into the system thereby supplying additional, but passively generated electricity into the system. The technology required is presently known to those skilled in the electricity generating arts and readily incorporated therein. Practically speaking, a solar panel would be preferably mounted upon the roof of the vehicle so that reception of solar radiation may be maximized.

Downstream from these several electricity generators, a consuming device 25 is seen through which the electricity passes and required amounts may be drawn therefrom. Surplus amounts are passed along the feed wire 90 to the storage unit or battery 17. The components thus far described would be carried upon the wheeled vehicle 10. From the storage unit 17 on the vehicle 10, the discharge connector 95 is provided for conveying electricity to the power acceptor 23.

Possible configurations of the several components of the present invention have been described. It should be appreciated that the technologies for constructing this invention are well known to those of ordinary skill in the art, however, the particularly advantageous and beneficial combination described herein is yet unknown to others. The configuration of the particular components is not considered to be critical. Instead, what is critical with respect to the generators configured on the wheel units 30 of the vehicle 10 is that the reactive wires 75 be oriented thereon to pass through and across the lines of force of a magnetic field.

A power generation system and its components have been described herein. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

What is claimed and desired to be secured by Letters Patent is as follows:

1. A system for producing electrical power on a wheeled vehicle, said system comprising:

a wheeled vehicle, said vehicle comprising a chassis carried upon a plurality of wheel units wherein each wheel unit is rotatably coupled to said chassis;

said wheel unit comprising a wheel and a hub upon which said wheel rotates relative to said chassis;

at least one of said wheel units being adapted to generate electricity and comprising at least one length of reactive wire and a magnetic field generator positioned in said wheel unit for relative motion therebetween during rotation of said wheel for inducing an electrical flow in said length of reactive wire thereby producing electricity.

2. The invention as recited in claim 1; wherein said magnetic field generator is oriented to direct a magnetic field generated therefrom toward said wheel and said length of reactive wire.

3. The invention as recited in claim 2; wherein said at least one length of reactive wire further comprises a plurality of reactive wire lengths, each reactive wire length oriented so that said reactive wire lengths cut across said magnetic field.

4. The invention as recited in claim 3; further comprising:

said wheel being substantially round shaped with an outside circumferential perimeter encircling said hub and about which said outside circumferential perimeter rotates;

at least a portion of said reactive wire lengths being positioned proximate to said outside circumferential perimeter and oriented transversely to radii extending from a center point of said hub to said circumferential perimeter of said wheel.

5. The invention as recited in claim 4; wherein said reactive wire lengths are oriented substantially perpendicular to said radii.

6. The invention as recited in claim 5; wherein a direction of said magnetic field is oriented substantially perpendicular to said reactive wire lengths.

7. The invention as recited in claim 6; wherein said direction of said magnetic field is substantially aligned with a radius of said wheel and substantially perpendicular to said reactive wire lengths.

8. The invention as recited in claim 5; further comprising:

a plurality of said reactive wire lengths being conductively interconnected by at least one transfer wire so that electricity is passable therebetween for cummulating electricity generated in said reactive wires in response to said reactive wires' passage through said magnetic field.

9. The invention as recited in claim 8; wherein said reactive wires and said transfer wires are combined into a wire coil so that only a reactive wire portion of said wire coil cuts perpendicularly through said magnetic field.

10. The invention as recited in claim 9; wherein a plurality of said wheel units are adapted to generate electricity.

11. The invention as recited in claim 9; wherein an auxilary wheel unit adapted to generate electricity is connected to said wheeled vehicle.

12. The invention as recited in claim 8; wherein said transfer wire is connected to an electrical power storage unit for collecting the generated electricity from said reactive wires.

13. The invention as recited in claim 12; wherein said slip connection comprises a b rush and ring that slippingly engage one another for communicating electricity and accomodating relative movement therebetween.

14. The invention as recited in claim 12; said transfer wire extending between said reactive wires and said hub, said hub comprising a slip connection for electrically communicating said transfer wire with said electrical power storage unit.

15. The invention as recited in claim 12; said transfer wire extending between said reactive wires and said hub, said hub comprising a slip connection for electrically communicating said transfer wire with an electrical power consuming device.

16. The invention as recited in claim 15; further comprising:

a surplus power feed wire electically connected between said power consuming device and said electrical power storage unit for transmitting surplus power supplied to said power consuming device to said electrical power storage unit.

17. The invention as recited in claim 16; further comprising:

a discharge connector extending between said electrical power storage unit for electrically communicating said storage unit with an outside electrical power acceptor for accomodating the transfer of stored power from said storage unit to said acceptor for third party usage.

18. The invention as recited in claim 17; said outside electrical power acceptor being an electric public utility system.

19. The invention as recited in claim 17; said electrical power storage unit being a battery bank.

* * * * *